United States Patent
Bhagwath et al.

(10) Patent No.: US 7,310,738 B2
(45) Date of Patent: Dec. 18, 2007

(54) MULTIFUNCTIONAL CONTROL OF COOLING SYSTEMS FOR COMPUTERS

(75) Inventors: Nitin Bhagwath, Lincoln, CA (US); Naysen Robertson, Orangevale, CA (US); Sachin Navin Chheda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 11/054,588

(22) Filed: Feb. 9, 2005

(65) Prior Publication Data

US 2006/0178786 A1    Aug. 10, 2006

(51) Int. Cl.
*G06F 1/00* (2006.01)
*G06F 1/26* (2006.01)
*G06F 1/32* (2006.01)

(52) U.S. Cl. .................... 713/300; 713/320

(58) Field of Classification Search ........... 700/300; 713/300, 320
See application file for complete search history.

(56) References Cited

U.S. PATENT DOCUMENTS

| | | | |
|---|---|---|---|
| 5,249,741 A | 10/1993 | Bistline et al. | |
| 5,926,386 A | 7/1999 | Ott et al. | |
| 6,336,080 B1 * | 1/2002 | Atkinson | 702/132 |
| 6,340,874 B1 * | 1/2002 | Vladimir | 318/471 |
| 6,349,385 B1 * | 2/2002 | Kaminski et al. | 713/300 |
| 2003/0011984 A1 * | 1/2003 | Chu et al. | 361/687 |

OTHER PUBLICATIONS

GIGABYTE Technology Co.; EasyTune TM4 Overview; 2002; 2 pgs.; http://www.giga-byte.com/motherboard/filelist/newtech/tech_ez4_hlp_uioverview.htm; USA.

* cited by examiner

*Primary Examiner*—Thomas Lee
*Assistant Examiner*—Michael Wang

(57) ABSTRACT

A fan controller in one exemplary embodiment facilitates control over a cooling system having fans in a computing apparatus, and permits operating system and application program based software inputs as well as hardware inputs to be utilized in the control of the fans.

41 Claims, 2 Drawing Sheets

MULTIFUNCTIONAL CONTROL OF COOLING SYSTEMS FOR COMPUTERS

BACKGROUND

This invention relates generally to computing systems and more specifically relates to the control of cooling systems in computing systems, especially but not limited to, fans used to maintain electronic components within an acceptable operating temperature range.

Computing systems utilize a plurality of electronic components including integrated circuits that generate a substantial amount of heat during operation. Cooling systems of various types are employed to maintain the temperature of the electronic components and the environment of the electronic components within an acceptable operating temperature range. For example, a personal computer in a desk-top case typically utilizes one or more fans mounted at the rear of the case to circulate outside air through the case to carry away heat generated by integrated circuits, especially the primary microprocessor, and other electronic components contained within the case.

The control of the speed of such cooling fans may be fixed or varied in steps under the control of a hardware management-driven device. In a basic implementation, the fan speed is not regulated and runs at its revolutions per minute (RPM) rating associated with a nominal applied operating voltage/current that is not varied. A hardware management control device, such as a baseboard management controller (BMC), can provide a low-level control and sensing of the speed of the fans and of operating temperatures of key components. Such a control device operates independent of the operating system (OS) used by the computing system and is active even prior to the loading of the operating system. Some basic input/output systems (BIOS) operate in conjunction with the BMC and provide some level of user control by setting BIOS parameters, such as setting a user alarm to be issued when a predetermined operating temperature of the primary microprocessor is exceeded.

Such uses and functions give rise to needs that are discussed at the beginning of the Detailed Description section in view of the implementations of the present invention.

SUMMARY

The invention in one implementation encompasses a method for controlling a cooling system in a computing apparatus. Software instructions originated by one of an operating system and an application program running on the computing apparatus are received at the controller for the cooling system. Input information related to the control of the cooling system is retrieved by the controller in response to receiving the software instruction. A first control signal based on the software instruction and the input information is generated and transmitted to the cooling system. The first control signal controls an amount of cooling provided by the cooling system to the computing apparatus.

Another implementation of the invention encompasses a computing apparatus that includes a cooling system including at least one fan. A fan controller is adapted to receive a software instruction originated by one of an operating system and an application program running on the computing apparatus. The fan controller retrieves input information related to the control of the at least one fan in response to receiving the software instruction. The fan controller generates a first control signal based on the software instruction and the input information, and transmitting the first control signal to the at least one fan, the first control signal controlling an amount of cooling provided by the at least one fan.

A further implementation of the invention encompasses an article including one or more computer-readable signal-bearing media. Means in the one or more media enables receiving a software instruction originated by one of an operating system and an application program running on a computing apparatus. Another means in the one or more media enables retrieving input information related to the control of a cooling system. Further means in the one or more media enables generating a first control signal based on the software instruction and the input information, and transmitting the first control signal to the cooling system, the first control signal controlling an amount of cooling provided by the cooling system to the computing apparatus.

DESCRIPTION OF THE DRAWINGS

Features of exemplary implementations of the invention will become apparent from the description, the claims, and the accompanying drawings in which:

DETAILED DESCRIPTION

Referring to the Background section above, it is recognized in accordance with an aspect of the present invention that it would be beneficial to enable the operating system to query for status of related inputs and exert control over the cooling system. Such operation permits device drivers to be created and utilized to interface with low-level hardware associated with the fan cooling system. This capability permits the operating system and application programs (AP) to exercise a higher level of intelligence to monitor temperature and other inputs, and control fan speed to effectuate different strategies and priorities. Hence, a holistic approach to cooling system management is facilitated.

Further aspects of implementations of the present invention are useful. For example, control of the cooling system directed by the operating system and/or application program can be employed while simultaneously supporting low-level hardware control for basic management. Since the operating system and application programs are now capable of controlling the cooling system, preemptive action can be taken based on predicted system needs such as increasing the RPM fan speed in anticipation of heavy demands on the microprocessor that give rise to the need for increased heat dissipation. Additional inputs beyond temperature measurements within the computer can be obtained and utilized as parameters that impact the control of the fan speed to effectuate cooling system efficiency. Inputs from users through the operating system and/or application programs can be employed to effectuate different operating profiles, such as a "quiet operation mode" in which a slower fan speed is desired to decrease noise at the expense of decreasing computing performance to match the decreased heat dissipation capability.

Figure 1:
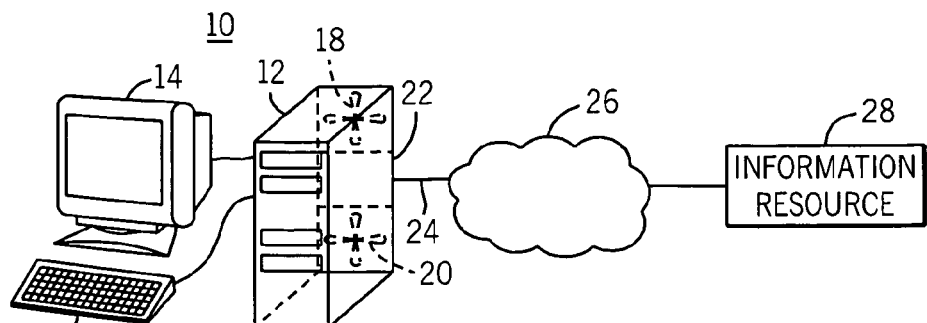
FIG. 1 illustrates an exemplary implementation of a computing system suited for incorporating an embodiment of the present invention.

FIG. 1 illustrates an exemplary computing system 10 suitable for incorporating an implementation of the present invention. The computing system 10 includes a personal, desktop computer 12 supported by external peripherals including a monitor 14 and keyboard 16. Fans 18 and 20 are mounted to the top and bottom, respectively, of the rear panel 22 of computer 12. In the exemplary computer 12, the fans are oriented to blow hot air from the interior of the computer out through the rear panel 22 with outside ambient (cooler) air entering through the front and/or sides of the case of the computer. An additional fan (not shown) may be mounted to an internal component with high heat dissipation requirements, such as a primary microprocessor, to provide additional local cooling in conjunction with a heat sink typically mounted to the microprocessor. Computer 12 may also include read only memory, random access memory and non-volatile memory such as a hard disk.

A communication link 24, such as carrying information via Ethernet or TCP/IP protocol, connects the computer 12 with a communication network 26. An information resource 28 is also coupled to the communication network 26 and stores information that is accessible to the computer 12. In accordance with an implementation of the present invention, information resource 28 may contain information relevant to determining heat transfer requirements of computer 12 such as weather information including ambient temperature, air pressure level, humidity level, etc. Such information will be especially important were computer 12 is located in an environment that is not climate controlled. Information resource 28 may also contain information relating to computational loads that are scheduled or predicted to be placed on computer 12 especially where the computer 12 serves as a remote processing center for other network based devices.

Figure 2:
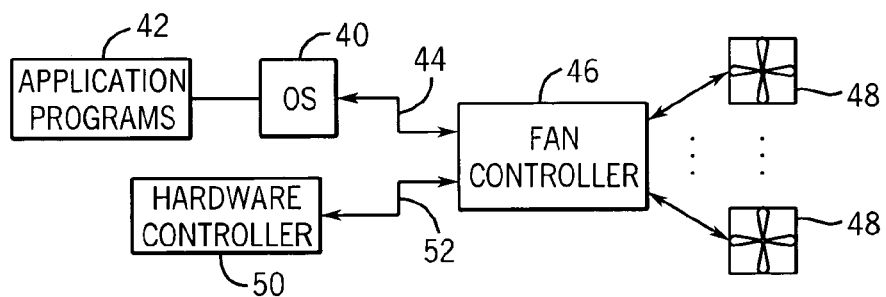
FIG. 2 is a block diagram of an exemplary implementation of the present invention.

FIG. 2 illustrates a functional block diagram of an exemplary implementation that may reside in computer 12. An operating system 40, such as a Windows operating system available from Microsoft Corporation, is loaded during the startup initialization process of computer 12. Following the loading of the operating system and device drivers, application programs 42 can be initiated to provide a variety of functionality depending upon the needs of the user. The application programs interact with various computer functions and modules through the operating system. The operating system 40 is linked by a communication interface 44 to a fan controller 46. The communication interface 44 may follow communication standards such as the Advanced Configuration and Power Interface (ACPI) standards. The fan controller 46, which will be discussed in more detail below, transmits information relevant to cooling system needs to the operating system 40 in response to queries and receives instructions from the operating system for controlling fans 48. These fans may provide a tachometer signal representative of the RPM speed of the fan to fan controller 46 and accept speed control signals sent by the fan controller such as by pulse width modulation signals. A hardware controller 50 is coupled by a known communication interface such as Intelligent Interface Controller (I2C) or Intelligent Platform Management Interface (IPMI) to the fan controller 46. The hardware controller 50 may consist of a known baseboard management controller that operates in conjunction with the BIOS of the computer to provide instructions for controlling the fans 48.

Figure 3:
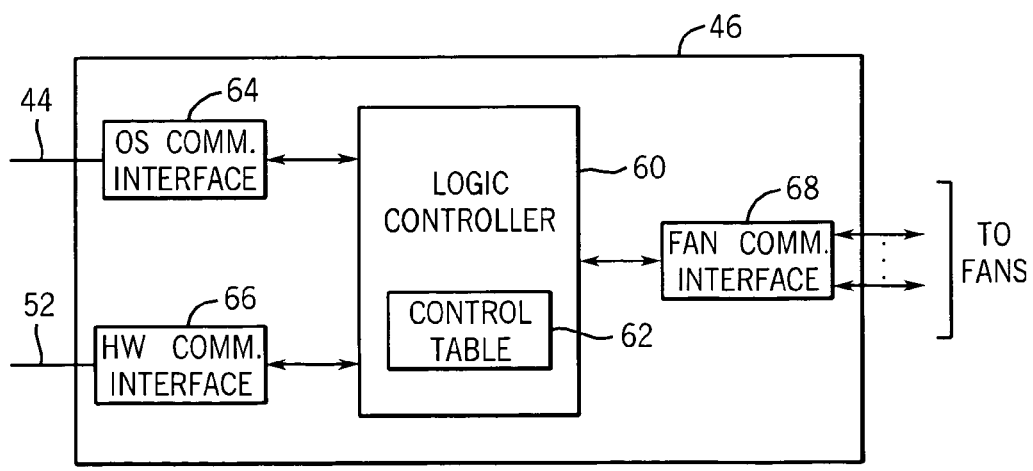
FIG. 3 is a block diagram of the exemplary fan controller of FIG. 2.

FIG. 3 shows an exemplary fan controller 46. A logic controller 60 may be implemented as a state machine and includes a control table 62 that may contain a variety of control parameters and instructions that operate in combination with other inputs to control ON/OFF and the RPM speed of each fan. The operating system communication interface 64 provides a communication interface between the logic controller 60 and the operating system 40 and application programs 42. The hardware communication interface 66 provides a communication interface between the logic controller 60 and the hardware controller 50. A fan communication interface 68 facilitates communications between the logic controller 60 and each fan 48. Since control table 62 can be accessed and at least some parameters within it read and written to by the OS and/or AP through a fan controller driver, communications with the logic controller can also be implemented in this way.

The following exemplary CONTROL TABLE 62 shows illustrative parameters associated with the operation of logic controller 60.

| Operational Mode | SW/HW Priority | Input 1 | Input 2 | Input N | Output |
|---|---|---|---|---|---|
| 1 | HW | Temp 1 | | | 100% |
| 2 | OS | Temp 2 | Loading 1 | Climate 1 | 70%-90% |
| 3 | AP | Temp 3 | Loading 2 | Climate 2 | 40%-60% |
| M | | | | | |

At any given time the logic controller 60 will be operating in one of the operational modes 1-M. The initial operational mode 1 is set by default during a boot start-up of the associated computer to correspond with commands from the hardware controller 50. This corresponds to a hardware (HW) priority. In this mode input 1 contains a stored temperature value (Temp 1) that represents a sensed temperature at which an alarm is to be issued. The corresponding Output column is 100% representing that the logic controller 60 will send a signal to the fan(s) commanding that the fans operate at a 100% RPM rate.

After the operating system has loaded including a driver for the fan controller, a new operational mode 2 (the OS default mode) is set by the operating system. This corresponds to a software priority associated with the OS. In this mode, input 1 contains a stored temperature value (Temp 2) that represents a maximum temperature of the microprocessor in the computer that is acceptable in order for the operational mode to continue in mode 2. Inputs 1—N represent a variety of possible input parameters that can be employed to control the operation of the fans through the logic controller 60. Input 2 contains a value Loading 1 that represents in this exemplary mode a maximum level of microprocessor loading that can be sustained with operational mode 2 in effect. Input N contains a value Climate 1 that represents a function associated with a measured or predicted outside climate condition (outside air temperature, humidity). The Output column is 70%-90% representing that the logic controller 60 will send a signal to the fans commanding that the fans operate between 70%-90% of the maximum RPM rate of the fans. In this mode logic controller 60 will issue a command to the fans causing the operation to be within the set range with the actual value within the range determined by a comparison of the stored Inputs to corresponding measured values. Exceeding the maximum temperature value Temp 2 for a predetermined period of time will cause the operational mode to automatically change to operational mode 1.

Operational mode 3 corresponds to a software priority associated with an application program. The Inputs and Output associated with mode 3 operate in a similar manner as described above with regard to mode 2 except that exceeding the maximum temperature value Temp 3 for a predetermined period of time will cause the operational mode to automatically change to operational mode 2. This effectively provides a failsafe type of operation in which more airflow generated by the fans is permitted all the way to 100% of capacity. Since the application program (and the OS) can access the control table and write at least to selected inputs, this provides a more sophisticated and higher level of fan control as compared with utilization of only the hardware fan controller 50.

Figure 4:
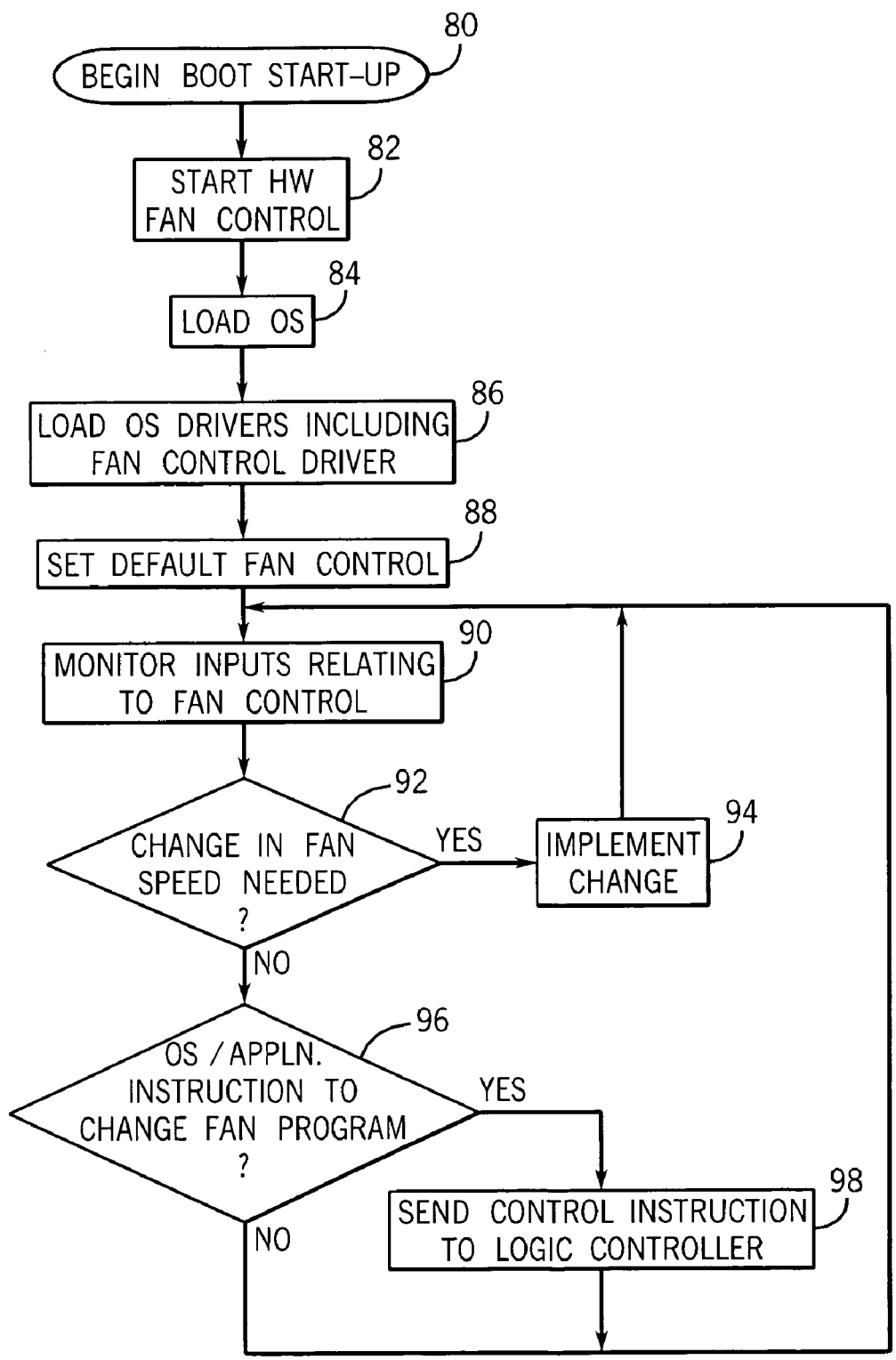
FIG. 4 is a flow diagram of an exemplary implementation of a method in accordance with the present invention.

FIG. 4 illustrates a flow diagram of steps in accordance with an exemplary method of the present invention that can be, but is not limited to, implementation by the embodiment shown in FIGS. 1-3. In step 80 a boot start-up process is begun for computer 12. Hardware control of the fan such as corresponding to operational mode 1 is initially implemented by the hardware controller 50 in step 82 as part of the boot up process prior to the operating system being loaded. In step 84 the start up process continues with the operating system being loaded. In step 86 the drivers for the operating system are loaded and include a fan control driver. In step 88 the OS sets a default fan control such as operational mode 2. It will also be apparent that various application programs may be automatically started following the loading of the operating system and its drivers, or may be manually started by a user command. Thus, various application programs will likely be running as well as the operating system. In step 90 the fan controller 46 monitors the current value of parameters associated with the inputs of control table 62. This may be accomplished by the logic controller 60 periodically reading values stored in memory and/or register locations by the hardware controller 50, operating system and/or application programs.

In step 92, a determination is made by the logic controller of whether a change in fan speed is needed. This determination may consist of a comparison of input values stored in the control table 62 with the corresponding measured values. A stored equation for each operational mode based on these comparisons can be utilized to determine the fan RPM value to be utilized within the permitted Output range. A YES determination by step 92 results in the change being implemented at step 94 such as the fan controller 46 sending a corresponding command signal to the fans 48. Following step 94 the process returns to the input of step 90.

A NO determination by step 92 causes step 96 to make a determination of whether an operating system or application program instruction has been received to change the fan program. For example, a user input communicated through an application program may be generated because the operational mode to change from mode 2 to mode 3. This may correspond to a request by the user to operate in a "quiet mode", i.e. with less noise (lower RPM) being generated by the fan. A YES determination by step 96 results in a control instruction being sent to the logic controller 60 because the operational mode to be changed in step 98. Following this step the process returns to the input of step 90. A NO determination by step 96 also results of the process returning to the input of step 90.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention. The fan controller can be any form of hardware or software implementation as long as it can respond to commands from the hardware controller 50, including commands issued prior to the completion of the boot up process, and commands issued from the OS and AP. Although the logic controller 60 is described as being implemented as a state machine, it can be any form of hardware or software that can meet the requirements as explained with regard to hardware controller 50. The control table 62 can also store the current measured values corresponding to the input parameters. Alternatively, the input parameters and the measured values corresponding to the parameters for control table 62 can be stored at any location that is accessible to the logic controller. Various types of information relating to climate, temperature, current loading and anticipated future changes of these can be utilized as parameters for setting various operational modes. It will be understood that various types of cooling systems that have a controllable cooling capacity can be controlled in accordance with embodiments of the present invention. Although one implementation is envisioned as utilizing one fan controller associated with the control of a corresponding computer, a single fan controller can be utilized to control cooling systems in a plurality of computing apparatus as long as appropriate signaling is provided for carrying the required corresponding inputs and outputs. Various types of personal computers, work stations, servers, industrial controllers, and other computing apparatus can employ the embodiments.

The above discussed modifications are offered merely as examples of possible changes that can be made and are not to be considered a listing of all possible changes. The scope of the invention is defined in the following claims.

What is claimed is:

1. A method for controlling a cooling system in a computing apparatus comprising the steps of:

receiving at a controller for the cooling system a software instruction originated by one of an operating system and an application program running on the computing apparatus;

receiving at the controller for the cooling system a hardware instruction from a hardware controller disposed in the computing apparatus;

retrieving, by the controller in response to receiving the software and hardware instructions, input information corresponding to each instruction and related to the control of the cooling system;

selecting at the controller which of the software and hardware instruction is to be used;

generating a first control signal based on the selected instruction and the corresponding input information, and transmitting the first control signal to the cooling system, the first control signal controlling an amount of cooling provided by the cooling system to the computing apparatus.

2. The method of claim 1 wherein the step of selecting further comprises the steps of:

determining at the controller which of the software and hardware instructions have corresponding input information that demands a greater amount of cooling by the cooling system;

selecting the one of the software and hardware instructions having the corresponding greater amount of cooling demand and generating a second control signal based on the one instruction and transmitting the second control signal to the cooling system, the second control signal controlling an amount of cooling provided by the cooling system to the computing apparatus.

3. The method of claim 1 further comprising the step of loading a software driver for the controller to enable communications between the controller and the one of an operating system and an application program.

4. The method of claim 3 further comprising the step of automatically generating and transmitting a default control signal to the cooling system following the loading of the software driver, the default control signal setting a default amount of cooling to be provided by the cooling system to the computing apparatus.

5. The method of claim 3 further comprising the step of periodically monitoring for a further software instruction.

6. The method of claim 1 further comprising the step of periodically monitoring for changes in the input information.

7. The method of claim 1 wherein the application program consists of a software application program that is loaded following the loading of the operating system.

8. The method of claim 1 further comprising the steps of selecting a first operational mode corresponding to the software instruction from a plurality of stored predetermined operational modes, the first operational mode specifying the input information to be retrieved.

9. The method of claim 8 wherein the input information comprises at least a first value associated with a first parameter that is part of the input information.

10. The method of claim 9 further comprising the step of periodically comparing current values associated with the first parameter with said first value, and based on results of this comparison determining whether the first control signal is to be generated.

11. The method of claim 6 wherein the input information comprises a stored first value of a temperature associated with an interior of the computing apparatus, the periodically monitoring step periodically monitoring for changes of the temperature associated with the interior of the computing apparatus, the method further comprising the step of periodically comparing the temperature associated with the interior of the computing apparatus with the stored first value, and based on results of this comparison determining whether the first control signal is to be generated.

12. The method of claim 1 wherein the step of retrieving input information comprises retrieving input information related to the control of the cooling system from an information source that is remote to the computing apparatus.

13. The method of claim 1 wherein the cooling system is at least one fan disposed within the computing apparatus and the first control signal controls the revolutions per minute of the at least one fan.

14. The method of claim 8 wherein each operational mode defines a predetermined range of cooling that can be provided by the cooling system.

15. The method of claim 14 further comprising the step of periodically monitoring for changes in the input information, wherein the input information comprises a stored first value of a temperature associated with an interior of the computing apparatus, the periodically monitoring step periodically monitoring for changes of the temperature associated with the interior of the computing apparatus, the method further comprising the step of periodically comparing the temperature associated with the interior of the computing apparatus with the stored first value, and based on results of this comparison determining whether the first control signal is to be generated, the first control signal causing the cooling provided by the cooling system to be within the predetermined range.

16. The method of claim 1 where the operating system and application program both reside as software.

17. A computing apparatus comprising:
a cooling system;
a controller means for receiving a software instruction originated by one of an operating system and an application program running on the computing apparatus and for receiving a hardware instruction from a hardware controller;
said controller means retrieving input information related to the control of the cooling system in response to receiving the software and hardware instruction;
said controller means selecting which of the software and hardware instruction is to be used and generating a first control signal based on the selected instruction and the input information, and transmitting the first control signal to the cooling system, the first control signal controlling an amount of cooling provided by the cooling system.

18. The computing apparatus of claim 17 further comprising:
the controller means determining which of the software and hardware instructions have corresponding input information that demands a greater amount of cooling by the cooling system;
said controller means selecting the one of the software and hardware instructions having the corresponding greater amount of cooling demand and generating a second control signal based on the selected instruction and transmitting the second control signal to the cooling system, the second control signal controlling an amount of cooling provided by the cooling system to the computing apparatus.

19. The computing apparatus of claim 17 further comprising means for loading a software driver for the controller for the cooling system to enable communications between the controller for the cooling system and the one of an operating system and an application program, the loading means automatically generating and transmitting a default control signal following the loading of the software driver to the controller means, the default control signal setting a default amount of cooling to be provided by the cooling system to the computing apparatus.

20. The computing apparatus of claim 17 further comprising means for periodically monitoring for changes in the input information.

21. The computing apparatus of claim 18 wherein application program consists of a software application program that is loaded following the loading of the operating system.

22. The computing apparatus of claim 17 wherein the controller means selects a first operational mode corresponding to the software instruction from a plurality of stored predetermined operational modes, the first operational mode specifying the input information to be retrieved.

23. The computing apparatus of claim 22 wherein the input information comprises at least a first value associated with a first parameter that is part of the input information.

24. The computing apparatus of claim 23 further comprising means for periodically comparing current values associated with the first parameter with said first value, and based on results of this comparison determining whether the first control signal is to be generated.

25. The computing apparatus of claim 20 wherein the input information comprises a stored first value of a temperature associated with an interior of the computing apparatus, the means for periodically monitoring periodically monitors for changes of the temperature associated with the interior of the computing apparatus, the computing apparatus further comprising means for periodically comparing the temperature associated with the interior of the computing apparatus with the stored first value, and based on results of this comparison determining whether the first control signal is to be generated.

26. The computing apparatus of claim 17 wherein the controller means retrieves input information related to the control of the cooling system from an information source remote to the computing apparatus.

27. The computing apparatus of claim 17 wherein the cooling system is at least one fan disposed within the computing apparatus and the controller means generates the first control signal that controls the amount of air cooling provided by the at least one fan to the computing apparatus.

28. The computing apparatus of claim 22 wherein each operational mode defines a predetermined range of cooling that can be provided by the cooling system.

29. The computing apparatus of claim 28 further comprising means for periodically monitoring for changes in the input information, wherein the input information comprises a stored first value of a temperature associated with an interior of the computing apparatus, the means for periodically monitoring periodically monitors for changes of the temperature associated with the interior of the computing apparatus, the computing apparatus further comprising means for periodically comparing the temperature associated with the interior of the computing apparatus with the stored first value, and based on results of this comparison determining whether the first control signal is to be generated, the first control signal causing the cooling provided by the cooling system to be within the predetermined range.

30. The computing apparatus of claim 29 wherein the operating system and application program both reside as software.

31. A computing apparatus comprising:
a cooling system including at least one fan;
a fan controller adapted to receive a software instruction originated by one of an operating system and an application program running on the computing apparatus and a hardware instruction from a hardware controller;
said fan controller retrieving input information related to the control of the at least one fan in response to receiving the software and hardware instructions;
said fan controller selecting which of the software and hardware instruction is to be used;
said fan controller generating a first control signal based on the selected instruction and the input information, and transmitting the first control signal to the at least one fan, the first control signal controlling an amount of cooling provided by the at least one fan.

32. The computing apparatus of claim 31 further comprising:
the fan controller determining which of the software and hardware instructions have corresponding input information that demands a greater amount of cooling by the cooling system;
the fan controller generating a second control signal based on the selected instruction and transmitting the second control signal to the at least one fan, the second control signal controlling an amount of cooling provided by the at least one fan to the computing apparatus.

33. The computing apparatus of claim 31 further comprising means for loading a software driver for the fan controller to enable communications between the fan controller and the one of an operating system and an application program, where the operating system and application program both reside as software, the loading means automatically generating and transmitting a default control signal following the loading of the software driver to the fan controller, the default control signal setting a default amount of cooling to be provided by the at least one fan to the computing apparatus.

34. The computing apparatus of claim 31 wherein the fan controller periodically monitors for changes in the input information.

35. The computing apparatus of claim 31 wherein the fan controller selects a first operational mode corresponding to the software instruction from a plurality of stored predetermined operational modes, the first operational mode specifying the input information to be retrieved.

36. The computing apparatus of claim 35 wherein the input information comprises at least a first value associated with a first parameter that is part of the input information.

37. The computing apparatus of claim 36 wherein the fan controller periodically compares current values associated with the first parameter with said first value, and based on results of this comparison determines whether the first control signal is to be generated.

38. The computing apparatus of claim 31 wherein the fan controller includes a logic controller.

39. The computing apparatus of claim 38 wherein the logic controller includes a control table that defines a plurality of operational modes.

40. An article, comprising:
one or more tangible computer-readable signal-bearing media;
means in the one or more media for receiving a software instruction originated by one of an operating system and an application program running on a computing apparatus and for receiving a hardware instruction from a hardware controller disposed in the computing apparatus;
means in the one or more media for retrieving input information related to the control of a cooling system corresponding to each received instruction;
means in the one or more media for selecting which of the software and hardware instruction is to be used;
means in the one or more media for generating a first control signal based on the selected instruction and its corresponding input information, and transmitting the first control signal to the cooling system, the first control signal controlling an amount of cooling provided by the cooling system to the computing apparatus.

41. The article of claim 40 further comprising means in the one or more media for loading a software driver to enable communications between a controller for the cooling system and the one of an operating system and an application program, where the operating system and application program both reside as software.

* * * * *